3,515,671
MICROBIOCIDALLY TREATED METAL
WORKING FLUIDS
Phillip Adams, Murray Hill, Edward Griffin Shay, Belle
Mead, and Alphonso N. Petrocci, Glen Rock, N.J., assignors to Millmaster Onyx Corporation, New York,
N.Y., a corporation of New York
No Drawing. Filed July 19, 1968, Ser. No. 746,001
Int. Cl. C10m 1/30
U.S. Cl. 252—54          6 Claims

ABSTRACT OF THE DISCLOSURE

This invention relates to the use in metal working lubricants of antimicrobial α-halo, α,β-unsaturated carbonyl compounds of the type which may be derived by, for example, the Claisen-Schmidt condensation of a substituted or unsubstituted aromatic aldehyde with an aldehyde or a ketone, followed by halogenation and subsequent dehydrohalogenation, and having the general formula:

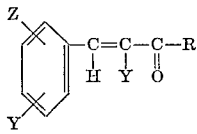

wherein X is a halogen, and Y and Z may be hydrogen, halogen, alkyl or nitro, and R may be hydrogen or alkyl, aryl or cycloalkyl containing from 1 to 8 carbon atoms.

SPECIFICATION

This invention relates to the use in metal working lubricants of antimicrobial α-halo, α,β-unsaturated carbonyl compounds of the type which may be derived by, for example, the Claisen-Schmidt condensation of a substituted or unsubstituted aromatic aldehyde with an aldehyde or a ketone, followed by halogenation and subsequent dehydrohalogenation, and having the general formula:

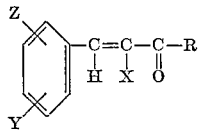

wherein X is a halogen, and Y and Z may be hydrogen, halogen, alkyl or nitro, and R may be hydrogen or alkyl, aryl or cycloalkyl containing from 1 to 8 carbon atoms.

Methods for the preparation of these types of compounds are well known to those skilled in the art. For example, benzaldehyde or its mono- or di-alkyl, halo or nitro substituted derivatives may be condensed with an aldehyde such as acetaldehyde, propionaldehyde and the like, or a ketone, such as acetone, methyl ethyl ketone, acetophenone, methyl cyclohexyl ketone, or the like. Thereafter, the resulting substituted or unsubstituted cinnamaldehyde or its derivatives may be halogenated, in the course of which process two halogen atoms add at the double bond. On treatment with a mild alkali, one halohydrogen is split off, leaving the desired compound, namely, a substituted or unsubstituted alpha halo cinnamaldehyde.

It is an object of the present invention to incorporate antimicrobial compounds of the above types into those formulations in which disinfectant, that is microbicidal or microbiostatic properties, are desired.

It is particularly an object of the present invention to incorporate alpha-bromo-cinnamaldehyde in such formulations in order to control the proliferation of microorganisms in solutions or dispersions or emulsions of the metal-working lubricants known as cutting and grinding fluids, the said fluids serving to lubricate, cool and wash away chips, turnings, drillings and cuttings of metal objects as they are being tooled.

Metal-working compounds of the aforesaid type are described, for example, in E. L. H. Bastian's "Metalworking Lubricants," chapters 2 and 3 (McGraw, Hill Book Co., New York 1951). These fluids are subject to microbial decomposition, particularly since they are usually recycled over extended periods of time, sometimes for periods of up to a year. As a result, the emulsifying agents therein may be destroyed or decomposed, thereby breaking the emulsions and negating the functions of the lubricants.

Another result of the decomposition is the generation of offensive odors. Furthermore, the putrefaction of the lubricants represents not only a nuisance, but a financial loss when the fluids must be discarded.

Various antimicrobial agents have been employed in cutting and grinding fluid concentrates, most of which are only barely effective at economic use concentrations. The most successful are the phenols and the mercurials; however, these are objectionable in many localities where they have been proscribed as contributing to stream pollution. Another agent, tris-hydroxymethyl nitromethane, initially effective in the concentrates, loses its effectiveness on standing therein and is not reliable under common machine shop practice.

Although metal lubricants such as oils and greases are employed in certain types of machining, they are not the most effective class where a good cooling medium is required, water being considerably more effective for removing the heat generated in machining. Cutting and grinding fluids which are soluble in, or dispersible or emulsifiable in water are much more effective, and are either obtainable as concentrates, or are so formulated in the shop, for addition to water.

The concentrates are then further diluted for use as required, and are commonly recycled or recirculated, usually after straining or separating the metal cuttings and grindings. Heavy duty fluids may range from about 3:1 to 12:1 use dilution; light duty fluids may range from about 20:1 to even 100:1 in some cases, depending on the particular use, the preference of the shop and the experience of the machinist. In any case, the solution or emulsion must stand up under repeated recirculation without breaking out or decomposing.

As indicated above, these cutting or grinding fluid concentrates may be water soluble, such as certain amine soaps and salts of phosphate esters, or they may be water dispersible, such as those containing mahogany acid soaps or tallow soaps and the like. They may also be oils, either hydrocarbon or fatty, as such, or sulfurized, chlorinated, or containing other substituents or additives, along with emulsifying agents such as, for example, alkylaryl sulfonates, or mahogany soaps or fatty soaps, which on dilution make a normally stable emulsion.

Other auxiliaries, such as amines or nitrites or other corrosion inhibitors may also be contained in the formulations.

The following examples are intended to illustrate, but not to limit the invention.

EXAMPLE 1

A variety of common types of water based cutting and grinding fluids were tested as described below. Some of these are formulated commercial products. Others were formulated according to the art. To an aliquot of each, there was added and dissolved therein, sufficient alpha-bromo-cinnamaldehyde such that on diluting one part of concentrate by volume with water to make 25 parts, the respective samples contained 400, 200 or lesser parts per million of the agent, as required.

Sterile wide mouth four ounce jars were charged with 100 ml. of the prepared fluids. In each case, a blank was set up containing the same fluids, but no preservative; these were examined for a background count of contaminating organisms.

A series of 24 hour broth cultures of *Escherichia coli, Staphylococcus aureus, Pseudomonas aeruginosa,* Bacillus species, Proteus species and *Aerobacter aerogenes* were pooled, diluted with sterile broth and inoculated into the 100 ml. volumes of prepared fluids to provide $1$–$10 \times 10^6$ bacteria cells/ml. of prepared fluids.

At weekly intervals, up to five weeks after the original inoculation, the samples were examined to determine the number of viable organisms present. At the five week point, each jar was re-inoculated with the culture as originally, and the testing was continued for a total period of ten weeks. The counts are given in the following table, in which S.L.A. represents a sulfurized lard oil composition, M.S. a mahogany soap-mineral oil composition, TEAN a triethanolamine naphthenate composition and TEAP a triethanolamine phosphate ester composition. The concentration of alpha-bromo-cinnamaldehyde is given in parts per million, and the bacterial count is to be multiplied by $10^3$.

therein, were heated to 120° F. and maintained at that temperature for two weeks prior to dilution. The results were essentially the same as in Example 2.

This clearly indicates that the formulation is stable in concentrated as well as in diluted form.

EXAMPLE 4

Alpha-bromo-cinnamaldehyde was tested for microbicidal activity using the "Standard Tube Dilution Test," which is common knowledge to those skilled in the art. It utilizes Difco Bacto Broth #0826 for the purpose of determining the lowest concentration of a biocidally active compound which will inhibit the growth of the organism in question. For a wide range of applications, the inhibition of growth rather than outright kill is satisfactory.

Briefly put, the Tube Dilution Test consists of putting 9 cc. of the CSMA Broth in a test tube which is then sterilized in an autoclave. One cc. of a solution of the microbiologically active compound at an appropriate concentration is added to the test tube which is then inoculated with 0.1 cc. of a twenty-four hours old culture of the organism under study. The test tube is then incubated at 37° C. for 48 hours and observed for bacterial growth.

The same procedure is followed for fungi, except that the tubes are incubated for fourteen days at a temperature

TABLE I

| Oil Comp. | Agent p.p.m. | Weeks | | | | | | | | | | |
|---|---|---|---|---|---|---|---|---|---|---|---|---|
| | | 0 | 1 | 2 | 3 | 4 | 5 | 6 | 7 | 8 | 9 | 10 |
| SLA | 0 | 2,760 | 280 | 1,600 | 2,700 | 3,700 | 3,200 | 5,800 | 4,000 | 1,500 | 1,600 | 8,400 |
| SLA | 400 | 2,760 | 0 | 0 | 0 | 0 | 0 | 0 | 0 | 0 | 0 | 0 |
| M.S. | 0 | 3,290 | 90,000 | 70,000 | 25,000 | 4,100 | 1,390 | 95,000 | 72,000 | 11,600 | 6,500 | 11,200 |
| M.S. | 200 | 3,290 | <10 | <10 | 0 | 0 | 0 | 0 | 0 | 0 | 0 | 0 |
| TEAN | 0 | 3,290 | 9,400 | <1,000 | 7 | 440 | 1,040 | 9,300 | 1,080 | 1,390 | 540 | 1,700 |
| TEAN | 200 | 3,290 | <10 | <10 | 0 | 0 | 0 | 0 | 0 | 0 | 0 | 0 |
| TEAP | 0 | 4,140 | 610 | 540 | 6,100 | 7,400 | 6,300 | 118,000 | 5,100 | 800 | 1,520 | 1,880 |
| TEAP | 400 | 4,140 | 0 | 0 | 0 | 0 | 0 | 0 | 0 | 0 | 0 | 0 |
| P.S. | 0 | 2,760 | 2,500 | 3,500 | 1,800 | 900 | 650 | 15,000 | 7,600 | 11,000 | 7,400 | 3,800 |
| P.S. | 200 | 0 | 0 | 0 | 0 | 0 | 0 | 0 | 0 | 0 | 0 | 0 |

The mahogany soap-mineral oil composition was further tested at higher dilutions, the results being tabulated in Table II.

suitable for optimum fungal growth, usually 25° C.

The organisms employed, and the abbreviations used in the following table, were: *Escherichia coli* (E.c.), *Pseu-*

TABLE II

| Oil Comp. | Agent, p.p.m. | Weeks | | | | | | | | | | |
|---|---|---|---|---|---|---|---|---|---|---|---|---|
| | | 0 | 1 | 2 | 3 | 4 | 5 | 6 | 7 | 8 | 9 | 10 |
| M.S. | 0 | 2,760 | 7,100 | 2,300 | 1,300 | 1,000 | 630 | 13,000 | 8,100 | 4,100 | 9,300 | 4,400 |
| M.S. | 200 | 2,760 | 0 | 0 | 0 | 0 | 0 | 0 | 0 | 0 | 0 | 0 |
| M.S. | 100 | 2,760 | 0 | 0 | 0 | 0 | 0 | 0 | 0 | 0 | 0 | 0 |

The alpha-bromo-cinnamaldehyde is thus found to be effective at low concentration in the said fluids.

For the sake of uniformity in testing, the 1:25 dilution was made standard. Variations are not likely to cause significant differences in view of the fixed preservative content.

EXAMPLE 2

Dilutions of cutting fluids prepared as in Example 1,

*domonas aeruginosa* (P.a.), *Staphylococcus aureus* (S.a.), *Streptococcus gaecalis* (S.f.), *Aspergillus niger* (A.n.), *Pencillium expansum* (P.e.), *Chlorella pyrenoidosa* (C.p.).

For comparison with the alpha-bromo-cinnamaldehyde, Ethyl Parasept (para-carbethoxy phenol), phenyl mercuric acetate, and also para bromobenzaldehyde were also tested.

TABLE III.—STATIC DILUTION LEVEL, IN PARTS PER MILLION

| Agent | E.c. | P.a. | S.a. | S.f. | A.n. | P.e. | C.p. |
|---|---|---|---|---|---|---|---|
| α-Br cinnamaldehyde | 10 | 100 | 50 | 500 | 50 | 10 | 1 |
| Ethyl parasept | 500 | 1,00 | 500 | 500 | <500 | <500 | >50 |
| Phenyl Hg acetate | 10 | 100 | 1 | 10 | 10 | 10 | |
| p-Bromobenzaldehyde | 1,000 | 1,000 | 1,000 | 1,000 | 1,000 | 100 | | but with the addition to each of five grams of iron filings, were maintained at a temperature of 120° F. for a period of two weeks, following which they were inoculated as before. They were then examined by determining the viable organism count, which was found to be essentially similar to those of Example 1.

EXAMPLE 3

Concentrates of the cutting fluids prepared as in Example 1, including the antimicrobial agents disclosed

EXAMPLE 5

Solutions of soap, containing 1% dry weight of soap, along with 0.5% of alpha-bromo-cinnamaldehyde, were tested by the Standard Tube Dilution Test. They were found to inhibit both gram negative and gram positive bacteria.

Obviously, many modifications of the present invention are possible in the light of the above teachings. It is, therefore, to be understood that within the scope of the ap-

The invention claimed is:

1. A metal working fluid containing a microbiocidally effective amount of a microbiocidal compound having the formula:

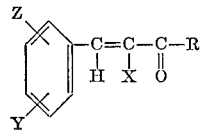

wherein X is a halogen and R is selected from the group consisting of hydrogen, alkyl and aryl and cycloalkyl containing 1 to 8 carbon atoms.

2. The fluid of claim 1 wherein the microbiocidal compound is an $a$-halo, $a,\beta$-unsaturated carbonyl compound.

3. The fluid of claim 1 wherein the microbiocidal compound is alpha-bromo-cinnamaldehyde.

4. In a method of grinding or cutting metal, the step of applying to the metal during the grinding or cutting process a cutting or lubricating fluid containing a microbiocidally effective amount of a microbiocidal compound having the formula:

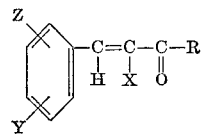

wherein X is a halogen and R is selected from the group consisting of hydrogen, alkyl and aryl and cycloalkyl containing 1 to 8 carbon atoms.

5. The method of claim 4 wherein the microbiocidal compound is an $a$-halo, $a,\beta$-unsaturated carbonyl compound.

6. The method of claim 4 wherein the microbiocidal compound is alpha-bromo-cinnamaldehyde.

References Cited

UNITED STATES PATENTS

| | | | |
|---|---|---|---|
| 2,318,013 | 5/1943 | Prutton et al. | 252—54 |
| 2,569,122 | 9/1951 | Adelson | 252—51.5 X |
| 3,067,138 | 12/1962 | Jahan et al. | 252—54 |

DANIEL E. WYMAN, Primary Examiner

W. J. SHINE, Assistant Examiner

U.S. Cl. X.R.

252—51.5; 424—333

UNITED STATES PATENT OFFICE
CERTIFICATE OF CORRECTION

Patent No. 3,515,671          Dated June 2, 1970

Inventor(s) Phillip Adams, et al

It is certified that error appears in the above-identified patent and that said Letters Patent are hereby corrected as shown below:

Column 1, in the Abstract of the Disclosure and in the Disclosure and in the Specification, delete Z and Y in the formulas,
    Claim 1, delete Z and Y in the formula,
    Claim 4, delete Z and Y in the formula.

Signed and Sealed this

Tenth Day of August 1976

[SEAL]

Attest:

RUTH C. MASON
*Attesting Officer*

C. MARSHALL DANN
*Commissioner of Patents and Trademarks*